Patented Aug. 22, 1939

2,170,562

UNITED STATES PATENT OFFICE 2,170,562

POULTRY FEED

Bernard Jurale, South Meriden, Conn.

No Drawing. Application April 28, 1938,
Serial No. 204,839

8 Claims. (Cl. 99—4)

This invention relates to an improved food for poultry and other stock, that is particularly adapted for the feeding of chickens, turkeys, and pheasants, although useful in the raising of other fowl for the market.

In raising chickens and other fowl one of the most serious problems arises from feather picking, or other forms of cannibalism. In raising chickens, for example, there is great likelihood that at some stage in the growth of the flock, cannibalism will develop, and there will be considerable feather pulling and tail picking, if not worse manifestations.

As a result of my observation and experiments, I believe this to be due to the lack of certain chemical materials in the diet, which are essential for proper growth and development of the poultry. When this want is supplied, cannibalism disappears, and there is evidence of the benefit of a changed diet in the body development and luxurious feather growth of the fowl, and, in the case of laying hens, in quality egg production.

It is an object of my invention to provide an improved food, and it is also an object to provide a food which is successful in overcoming cannibalism.

It is likewise an object to provide a food which enhances materially the feather growth of the poultry.

I have discovered that the desirable objects above stated can be brought about by adding to the diet of the poultry a keratinous substance, or one having a high content of keratin. The material which I prefer to use is horn meal. I use the term "horn meal" here in a generic sense, with the consideration in mind that hoof meal is an equivalent substance. The hooves of cattle and like animals have a covering or shell of horn, which, like the horns of cattle, consists essentially of keratin. If other portions of the hooves are likewise used in the preparation of the meal, the keratin content will be reduced, but it may still be suitable for the purpose. I have used, with very satisfactory results, what is known in the trade as horn and hoof meal, the same being prepared from both horns and hooves. The horns and hooves are treated with steam, as hereinafter described, before being ground. In the claims I use the expression "horn meal" generically unless the context indicates the contrary.

In feeding the poultry, my preferred procedure is to add the horn meal or other keratin ingredient to any approved or preferred mash. The amount of the keratin-bearing ingredient should be within the range of from .1% to 6%. In my experience, 2% has been a very satisfactory amount.

Before the horns or hooves, or a mixture of the two, are used for the purpose indicated, they are subjected to the action of steam under about 80 pounds pressure in a closed vessel for a period of about three hours. The purpose of this step is to make the material more brittle and more suitable for grinding, and also to make it more easily broken down by chemical decomposition into simpler protein substances. It also has a sterilizing effect.

The keratin-bearing ingredient should be added to the mash and mixed therewith. A typical poultry feed, according to my invention, might comprise, say, 70% of cereals, 10% of alfalfa meal, 7% of soy bean meal, 5% of meat scraps, 5% of dried milk, .5% of cod liver oil, .5% of salt, and 2% of ground horns of cattle. Another suitable mash might comprise, together with 2% of hoof and horn meal, the following ingredients in suitable proportions: Cod liver oil, dried skimmed milk, meat scraps, fish meal, soy bean oil meal, alfalfa meal, corn meal, wheat bran, wheat standard middlings, ground oats, ground barley, calcium carbonate, and salt.

As an addition to poultry mashes, the keratin-bearing substance may be supplied in combination with other ingredients. For example, I may provide a supplemental poultry feed consisting of 90 parts of steamed hoof and horn meal, 5 parts of hardwood charcoal, and 5 parts of molasses. These ingredients are well mixed together so as to form a meal which can be readily added to and mixed with any standard or preferred mash. The purpose of the molasses is to improve the odor of the keratin material and make it more palatable, and the charcoal absorbs gases, if any, formed in the digestive process, and is also useful in adding to the mineral content of the material.

In practice the improved poultry feed has shown remarkable results in eliminating cannibalism and enhancing body and feather growth, and in the case of laying hens, egg quality. Among other things, the hatchability of the eggs is increased. By using the improved feed, feather pulling and tail picking is much reduced, or altogether eliminated, and the rapidity with which the change of diet acts in this respect is quite surprising. In many cases young chickens or young pheasants can be brought along successfully by the usual methods to a certain point, but at this point they begin to pick at each other and pull feathers, and their physical condition quickly deteriorates. If at this point their diet is changed by adding somewhere in the neighborhood of 2% of the keratin-bearing substance, e. g., meal made from cattle horns, a favorable reaction and a disappearance of the symptoms are quickly, and in some cases almost immediately, noted.

While the beneficial results have been observed in practice, so as to make a theoretical discussion somewhat unnecessary, I may say that I consider the favorable influence upon the chickens or other stock to be due to the action of the keratin-bearing substance in the caeca, of which there are commonly two in birds. Keratin is considered to be indigestible, but is subject to decomposition, and as at present advised, I am of the opinion that decomposition of the keratin in the caeca leads to the absorption and assimilation by the body of components favorably influencing body growth, and increasing the luxuriance and improving the coloration of the feathers. More specifically, it is my opinion that the most useful component is the cystine which, as is well known, is one of the most important amino acids contained in keratin.

While I have given herein several examples of my improved poultry feed, it is to be understood that these are by way of illustration rather than limitation, and that further embodiments and modifications may be made without departing from the principles of my invention or the scope of the appended claims.

What I claim is:

1. A poultry feed containing with other ingredients a small percentage of a substance having a high keratin content.

2. A poultry feed containing horn meal.

3. A poultry feed containing from .1% to 6% of horn meal.

4. A poultry feed containing approximately 2% of horn meal.

5. A poultry feed comprising a mash containing approximately 2% of sterile horn meal.

6. A poultry mash containing with other ingredients from .1% to 6% of a product high in keratin.

7. A supplemental feed for poultry adapted to be added to a mash and comprising horn meal, charcoal and molasses.

8. A poultry feed containing a small percentage of ground cattle horn.

BERNARD JURALE.